(12) United States Patent
Komiya et al.

(10) Patent No.: US 8,111,006 B2
(45) Date of Patent: Feb. 7, 2012

(54) LIGHT EMITTING DIODE DRIVING APPARATUS

(75) Inventors: Kunihiro Komiya, Kyoto (JP); Hiroshi Sawada, Kyoto (JP)

(73) Assignee: Rohm Co., Ltd., Kyoto-shi, Kyoto (JP)

( * ) Notice: Subject to any disclaimer, the term of this patent is extended or adjusted under 35 U.S.C. 154(b) by 148 days.

(21) Appl. No.: 12/374,818

(22) PCT Filed: Mar. 13, 2008

(86) PCT No.: PCT/JP2008/054610
§ 371 (c)(1),
(2), (4) Date: Jan. 23, 2009

(87) PCT Pub. No.: WO2008/111642
PCT Pub. Date: Sep. 18, 2008

(65) Prior Publication Data
US 2010/0019687 A1    Jan. 28, 2010

(30) Foreign Application Priority Data
Mar. 15, 2007    (JP) .................................. 2007 066061

(51) Int. Cl.
*H05B 41/36* (2006.01)
(52) U.S. Cl. ......................... 315/291; 315/307; 315/294
(58) Field of Classification Search .................. 315/216, 315/294, 297, 291, 307, 247, 308, 224
See application file for complete search history.

(56) References Cited

U.S. PATENT DOCUMENTS

| | | | |
|---|---|---|---|
| 5,475,284 A * | 12/1995 | Lester et al. | 315/209 R |
| 6,252,355 B1 * | 6/2001 | Meldrum et al. | 315/150 |
| 6,822,403 B2 | 11/2004 | Horiuchi et al. | |
| 7,312,783 B2 | 12/2007 | Oyama | |
| 7,315,095 B2 * | 1/2008 | Kagemoto et al. | 307/39 |
| 7,675,245 B2 * | 3/2010 | Szczeszynski et al. | 315/291 |
| 2002/0047642 A1 * | 4/2002 | Miyagawa | 315/307 |
| 2006/0022616 A1 | 2/2006 | Furukawa et al. | |
| 2006/0049959 A1 * | 3/2006 | Sanchez | 340/855.3 |
| 2006/0125773 A1 | 6/2006 | Ichikawa et al. | |

FOREIGN PATENT DOCUMENTS

| | | |
|---|---|---|
| JP | 2002-111786 | 4/2002 |
| JP | 2004-022929 | 1/2004 |
| JP | 2006/031977 | 2/2006 |
| JP | 2006-140438 | 6/2006 |
| JP | 2006-171693 | 6/2006 |
| JP | 2006/320158 | 11/2006 |
| WO | WO 03/096436 | 11/2003 |

* cited by examiner

*Primary Examiner* — Shawki Ismail
*Assistant Examiner* — Crystal L Hammond
(74) *Attorney, Agent, or Firm* — Fish & Richardson P.C.

(57) ABSTRACT

A light emitting diode driving apparatus 10 of the present invention includes: a driving voltage generating section 11 for generating a driving voltage Vout of an LED; a driving current control section 12 for PWM controlling driving currents iW1 to iW3 that flow through the LED; and a monitor voltage generating section 13 that monitors the driving voltage Vout, and that generates a monitor voltage Vm during an OFF period of the driving current by superposing on a predetermined reference voltage Vref, which is used as a standard, a voltage corresponding to a difference occurring in the driving voltage Vout during the OFF period. The driving voltage generating section 11 performs feedback control of the driving voltage Vout such that feedback voltages VW1 to VW3 are equal to the reference voltage Vref during an ON period of the driving current, and the driving voltage generating section 11 performs feedback control of the driving voltage Vout such that the monitor voltage Vm is equal to the reference voltage Vref during an OFF period of the driving current Vout.

20 Claims, 4 Drawing Sheets

LIGHT EMITTING DIODE DRIVING APPARATUS

TECHNICAL FIELD

The present invention relates to a light emitting diode driving apparatus.

BACKGROUND ART

As an example of conventional arts related to the light emitting diode driving apparatus, Patent Document 1 discloses and proposes a DC/DC step-up method where a driving voltage fed to the anode of a light emitting diode is feedback controlled according to a feedback voltage derived from the cathode of the light emitting diode.

Also, in Patent Document 2, a light emitting apparatus that performs pulse width modulation control (hereinafter referred to as PWM (pulse width modulation) control) of a driving current that flows through a light emitting diode is disclosed and proposed by the applicant of the present application.

[Patent Document 1] JP-A-2004-22929
[Patent Document 2] JP-A-2002-111786

DISCLOSURE OF THE INVENTION

Problems to be Solved by the Invention

It is true that power consumption can be reduced with the conventional art disclosed in Patent Document 1 by eliminating an unnecessary margin given to a driving voltage fed to a light emitting diode. It is also true that the light-emission brightness of a light emitting diode can be freely controlled with the conventional art disclosed in Patent Document 2.

With a simple combination of the above-described conventional arts, however, it is very difficult to perform both feedback control of the driving voltage fed to the light emitting diode and PWM control of the driving current fed the light emitting diode, because a feedback voltage derived from the cathode of the light emitting diode greatly changes with the PWM control of the driving current and this results in a very unstable feedback control of the driving voltage.

In view of the above mentioned problems, an object of the present invention is to provide a light emitting diode driving apparatus that is capable of performing both feedback control of the driving voltage fed to a light emitting diode and PWM control of the driving current fed to the light emitting diode.

Means for Solving the Problem

To achieve the above object, according to one aspect of the present invention, a light emitting diode driving apparatus includes: a driving voltage generating section for generating a driving voltage fed to an anode of a light emitting diode; a driving current control section for performing pulse width modulation control of a driving current that flows through the light emitting diode; and a monitor voltage generating section that monitors the driving voltage, and that generates a monitor voltage during an OFF period of the driving current by superposing on a reference voltage, which is used as a standard, a voltage corresponding to a difference occurring in the driving voltage during the OFF period. Here, the driving voltage generating section performs feedback control of the driving voltage during an ON period of the driving current such that a feedback voltage derived from a cathode of the light emitting diode is equal to the reference voltage, and performs feedback control of the driving voltage during an OFF period of the driving current such that the monitor voltage is equal to the reference voltage (first structure).

In the light emitting diode driving apparatus having the first structure described above, it is preferable that the driving voltage generating section perform feedback control of the driving voltage such that a lower one of the feedback voltage and the monitor voltage is equal to the reference voltage, and that the driving voltage generating section pull the feedback voltage up to a level higher than the monitor voltage (second structure).

In the light emitting diode driving apparatus having the first or second structure described above, it is preferable that the driving voltage generating section include: a regulator for generating an intermediate voltage from an input voltage such that either the feedback voltage or the monitor voltage is equal to the reference voltage; and a charge pump for generating the driving voltage by stepping up the intermediate voltage (third structure).

In the light emitting diode driving apparatus having the first, second, or third structure described above, it is preferable that the monitor voltage generating section include: the monitor voltage generating section includes: a resistor to a first end of which the driving voltage is applied and from a second end of which the monitor voltage is derived; an operational amplifier that generates an error voltage between the monitor voltage and the reference voltage; a sample-hold circuit that samples the error voltage during an ON period of the driving current, and that holds a value of the error voltage sampled immediately before the driving current is turned off; and a current supply that generates, according to an output from the sample-hold circuit, a current that flows through the resistor (fourth structure).

In the light emitting diode driving apparatus having the fourth structure described above, it is preferable that a PWM control performed by the driving current control section, a feedback path switching control performed by the driving voltage generating section, and a sample-hold control performed by the monitor voltage generating section be based on a common control signal (fifth structure).

ADVANTAGES OF THE INVENTION

A light emitting diode driving apparatus of the present invention, which is capable of performing both feedback control of a driving voltage fed to a light emitting diode and PWM control of a driving current fed to the light emitting diode, makes it possible both to reduce power consumption of the light emitting diode, and to freely control light-emission brightness of the light emitting diode.

LIST OF REFERENCE SYMBOLS

10 light emitting diode driving apparatus
11 driving voltage generating section 11a series regulator
11b charge pump
12 driving current control section
13 monitor voltage generating section
14, 15 switch sections
P1 P-channel field-effect transistor
N1 N-channel field-effect transistor
AMP1, AMP2 operational amplifiers
E1 DC voltage supply
R1 resistor
C1, Cex capacitors
IR, IG, IB, IW1, IW2, IW3 constant current supplies
SWa, SWb, SWc switches
R red light emitting diode
G green light emitting diode
B blue light emitting diode
W1, W2, W3 white light emitting diodes

BEST MODE FOR CARRYING OUT THE INVENTION

Figure 1:
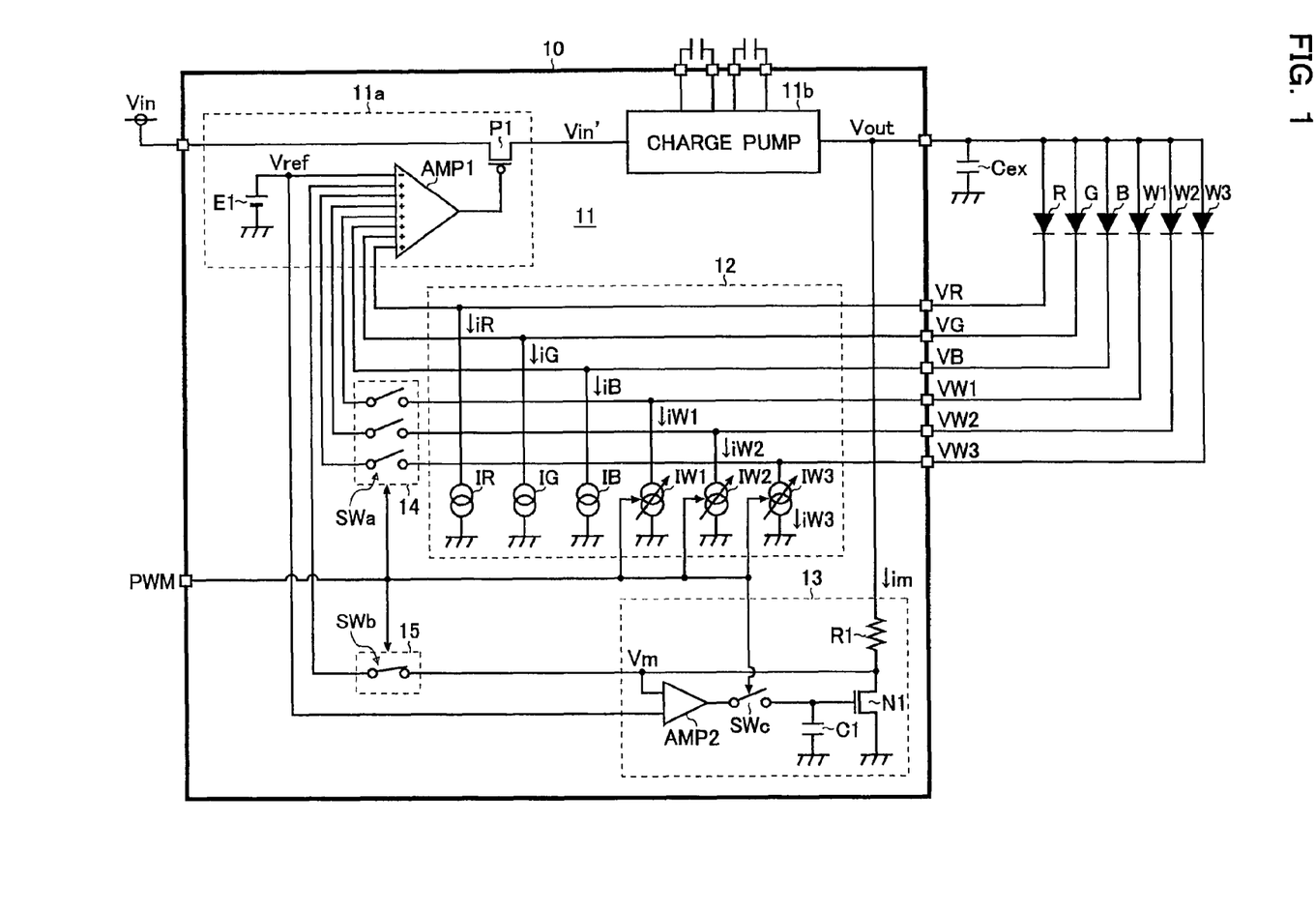
FIG. 1 is a block diagram showing the structure of an LED driving apparatus of the present invention incorporated in an electronic apparatus embodying the present invention.

FIG. 1 is a block diagram showing the structure of a light emitting diode driving apparatus of the present invention incorporated in an electronic apparatus (e.g., a mobile phone terminal) embodying the present invention.

As shown in FIG. 1, a light emitting diode driving apparatus 10 (hereinafter, LED (light emitting diode) driving apparatus 10) of this embodiment is a semiconductor integrated circuit device (a so-called LED driver IC) provided with, in a form integrated into the integrated circuit, a driving voltage generating section 11, a driving current control section 12, a monitor voltage generating section 13, a first switch section 14, and a second switch section 15, and controls the operation of light emitting diodes (in this embodiment, a red LED "R", a green LED "G", a blue LED "B", and white light emitting diodes W1, W2, and W3 that are connected in parallel to one another with the anodes thereof connected to a common terminal), which function as resistors.

The red, green, and blue light emitting diodes "R", "G", and "B" are used, for example, as indicator lamps of the electronic apparatus. The white light emitting diodes W1, W2, and W3 are used, for example, as a backlight for irradiating a liquid crystal display panel of the electronic apparatus with light from behind.

The driving voltage generating section 11 generates a driving voltage Vout that is fed to the anodes of the light emitting diodes "R", "G", and "B", W1, W2, and W3, and in this embodiment, it includes: a series regulator 11a that steps-down an input voltage Vin to generate an intermediate voltage Vin'; and a charge pump 11b that steps-up the intermediate voltage Vin' to generate the driving voltage Vout.

The regulator 11a includes an output transistor P1 (in this embodiment, a P-channel field-effect transistor), an operational amplifier AMP1, and a DC voltage supply E1. A source of the transistor P1 is connected to an input voltage Vin application terminal to which the input voltage Vin is applied. A drain of the transistor P1 is connected to an input terminal of the charge pump 11b. A gate of the transistor P1 is connected to an output terminal of the operational amplifier AMP1.

An inverting input terminal (−) of the operational amplifier AMP1 is connected to a positive terminal of the DC voltage supply E1 (a reference voltage Vref application terminal to which the reference voltage Vref is applied). A negative terminal of the DC voltage supply E1 is grounded. The operational amplifier AMP1 has a plurality of non-inverting input terminals (+), of which a first non-inverting input terminal is connected to a feedback voltage VR application terminal to which is applied the feedback voltage VR that is derived from a cathode of the red light emitting diode "R". A second non-inverting input terminal is connected to a feedback voltage VG application terminal to which is applied the feedback voltage VG that is derived from a cathode of the green light emitting diode "G". A third non-inverting input terminal is connected to a feedback voltage VB application terminal to which is applied the feedback voltage VB that is derived from a cathode of the blue light emitting diode "B". A fourth non-inverting input terminal is connected via the first switch section 14 to a feedback voltage VW1 application terminal to which is applied the feedback voltage VW1 that is derived from a cathode of the white light emitting diode W1. A fifth non-inverting input terminal is connected via the first switch section 14 to a feedback voltage VW2 application terminal to which is applied the feedback voltage VW2 that is derived from a cathode of the white light emitting diode W2. A sixth non-inverting input terminal is connected via the first switch section 14 to a feedback voltage VW3 application terminal to which is applied the feedback voltage VW3 that is derived from a cathode of the white light emitting diode W3. A seventh non-inverting input terminal is connected via the second switch section 15 to an output terminal of the monitor voltage generating section 13 (a monitor voltage Vm application terminal to which the monitor voltage Vm is applied).

The charge pump 11b is means for generating the driving voltage Vout that is fed to the anodes of the light emitting diodes by stepping-up the intermediate voltage Vin', which is generated by the regulator 11a, by using a charge-transfer switch (not shown) and a charge-transfer capacitor. The charge pump 11b of this embodiment is structured such that the step-up ratio thereof is variably controlled in a plurality of steps (e.g., a ×1.0 step-up state where the step-up ratio is 1.0, a ×1.5 step-up state where the step-up ratio is 1.5, and a ×2.0 step-up state where the step-up ratio 2.0). To a driving voltage Vout deriving terminal from which the driving voltage Vout is derived, a capacitor Cex is externally connected so as to smooth the driving voltage Vout.

The driving current control section 12 is means for individually controlling driving currents iR, iG, iB, iW1, iW2, and iW3 of the light emitting diodes "R", "G", "B", W1, W2, and W3, respectively, by using constant current supplies IR, IG, IB, IW1, IW2, and IW3. The constant current supplies IW1, IW2, and IW3 are particularly structured so as to perform PWM control (on-duty control) of the driving currents iW1, iW2, and iW3 that flow through the white light emitting diodes W1, W2, and W3, respectively, according to a PWM signal fed from outside the apparatus. In this embodiment, the driving currents iW1, iW2, and iW3 are kept on during a high-level period of the PWM signal, and they are kept off during a low-level period of the PWM signal. Such PWM control makes it possible to variably control the apparent values (mean values) of the driving currents iW1, iW2, and iW3, and thus to freely control the light-emission brightness of the white light emitting diodes W1, W2, and W3.

The monitor voltage generating section 13 is means for monitoring the driving voltage Vout and for generating the monitor voltage Vm during an off-period of the driving currents iW1, iW2, and iW3 by superposing on the reference voltage Vref, which is used as a standard, a voltage corresponding to a difference occurring in the driving voltage Vout during the OFF period (a difference in the driving voltage Vout between immediately before and after the driving currents iW1, iW2, and iW3 are turned off). In this embodiment, it includes: an N-channel field-effect transistor N1, a resistor R1, a capacitor C1, an operational amplifier AMP2, and a switch SWc.

One end of the resistor R1 is connected to a driving voltage Vout deriving terminal from which the driving voltage Vout is derived. The other end of the resistor R1 is connected to a drain of the transistor N1. A source of the transistor N1 is grounded. One input terminal of the operational amplifier AMP2 is connected to a drain of the transistor N1 (the monitor voltage Vm application terminal). The other input terminal of the operational amplifier AMP2 is connected to the positive terminal of the DC voltage supply E1 (the reference voltage Vref application terminal). An output terminal of the operational amplifier AMP2 is connected via the switch SWc to a gate of the transistor N1 and to one terminal of the capacitor C1. The other terminal of the capacitor C1 is grounded. The switch SWc is turned on/off according to the PWM signal described above, and in this embodiment, it is kept on during a high-level period of the PWM signal, and it is kept off during a low-level period of the PWM signal.

That is, the monitor voltage generating section 13 includes: the resistor R1 to one terminal of which the driving voltage Vout is applied and from the other terminal of which the monitor voltage Vm is derived; the operational amplifier AMP2 that generates an error voltage between the monitor voltage Vm and the reference voltage Vref; a sample-hold circuit (formed of the switch SWc and the capacitor C1) that samples the error voltage during an on-period of the driving currents iW1, iW2, and iW3, and that holds a value of the error voltage sampled immediately before the driving currents iW1, iW2, and iW3 are turned off; and a current supply (transistor N1) that generates a current "im" that flows through the resistor R1 according to an output of the sample-hold circuit.

The first switch section 14 includes switches SWa one of which is connected between the fourth non-inverting input terminal of the operational amplifier AMP1 and a reference voltage VW1 application terminal to which is applied the reference voltage VW1 that is derived from the cathode of the white light emitting diode W1, another of which is connected between the fifth non-inverting input terminal of the operational amplifier AMP1 and a reference voltage VW2 application terminal to which is applied the reference voltage VW2 that is derived from the cathode of the white light emitting diode W2, and the other of which is connected between the sixth non-inverting input terminal of the operational amplifier AMP1 and a reference voltage VW3 application terminal to which is applied the reference voltage VW3 that is derived from the cathode of the white light emitting diode W3. The switches SWa are turned on/off according to the PWM signal described above, and in this embodiment, they are kept on during a high-level period of the PWM signal, and they are kept off during a low-level period of the PWM signal.

The second switch section 15 includes a switch SWb that is connected between the seventh non-inverting input terminal of the operational amplifier AMP1 and the monitor voltage Vm application terminal. The switch SWb is turned on/off according to the above-described PWM signal alternatively and complementarily with respect to the switches SWa and SWc. In this embodiment, the switch SWb is kept off during a high-level period of the PWM signal, and it is kept on during a low-level period of the PWM signal.

Next, a detailed description will be give of the operation of the LED driving apparatus 10 structured as described above with reference to FIG. 2.

Figure 2:
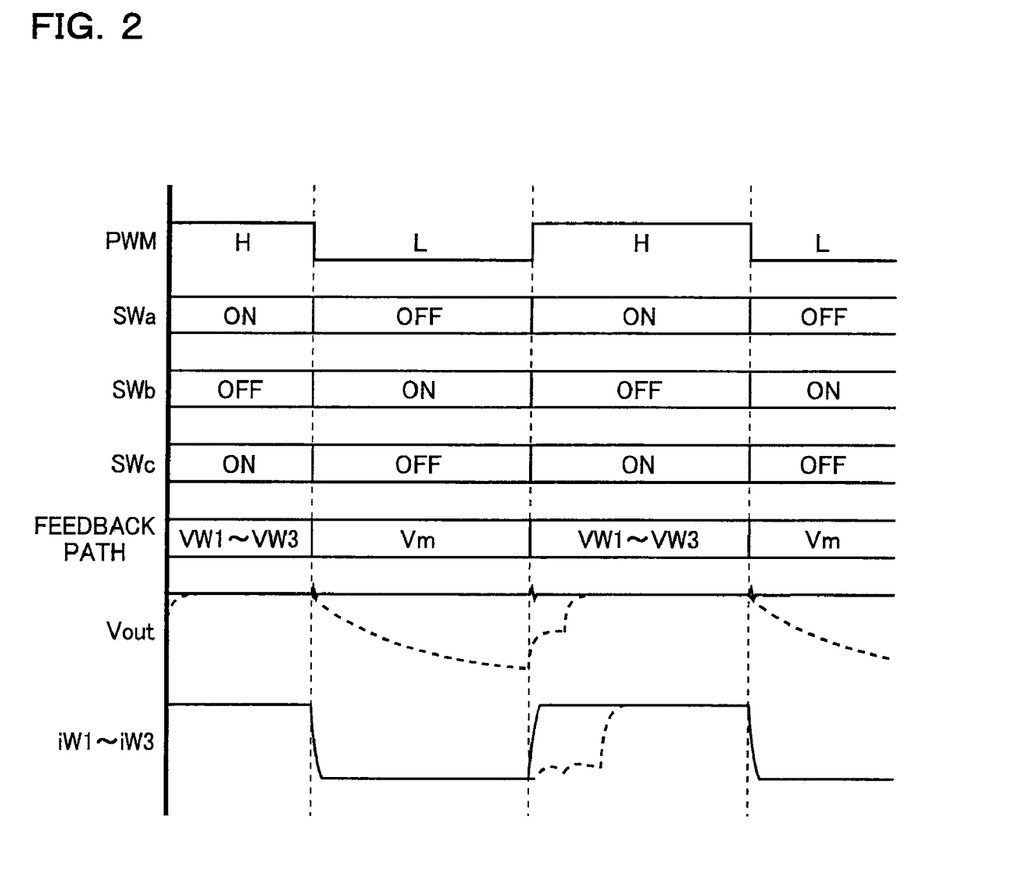
FIG. 2 is a diagram illustrating an example of the operation of the LED driving apparatus of the present invention.

FIG. 2 is a diagram illustrating an example of the operation of the LED driving apparatus 10. FIG. 2 shows, from the top of the sheet, the logic state of the PWM signal, the on/off states of the switches SWa, SWb, and SWc, the feedback path switching state of the driving voltage generating section 11, the voltage waveform of the driving voltage Vout, and the current waveform of the driving currents iW1, iW2, and iW3. In FIG. 2, the behaviors of the driving voltage Vout and the driving currents iW1, iW2, and iW3 in the present invention are indicated by solid lines, and those in a conventional example are indicated by broken lines.

During a high-level period of the PWM signal (an on-period of the driving currents iW1 to iW3), the switches SWa are kept on, and the switch SWb is kept off. As a result, as feedback paths of the operational amplifier AMP1 constituting the regulator 11a, feedback paths of the feedback voltages VW1, VW1, and VW3 are connected in addition to feedback paths of the feedback voltages VR, VG, and VB, which are constantly connected, while a feedback path of the monitor voltage Vm is disconnected.

In this state, the operational amplifier AMP1 generates a gate voltage of the output transistor P1 such that the lowest one of the feedback voltages VR, VG, VB, VW1, VW2, and VW3 is equal to the reference voltage Vref.

More specifically, when the lowest of the above-mentioned feedback voltages is higher than the reference voltage Vref, the operational amplifier AMP1 increases the level of the gate voltage of the output transistor P1 so as to close the output transistor P1 to a higher degree; in contrast, when the lowest of the above-mentioned feedback voltages is lower than the reference voltage Vref, the operational amplifier AMP1 reduces the level of the gate voltage of the output transistor P1 so as to open the output transistor P1 to a higher degree.

Since the forward voltage drop of a white light emitting diode is generally larger than that of a color light emitting diode, the gate voltage of the output transistor P1 is generated such that the lowest one of the feedback voltages VW1, VW2, and VW3 is equal to the feedback voltage Vref when the white light emitting diodes W1, W2, and W3 are kept on.

This allows real-time generation of the driving voltage Vout at a level most favorable for whichever of the connected LEDs "R", "G", and "B" has the greatest forward voltage drop to be driven safely. As a result, an unnecessary margin given to the driving voltage Vout can be reduced to improve the efficiency, and this contributes to achieving reduced power consumption of an electronic apparatus incorporating the LED driving apparatus 10.

In particular, used as an LED driving apparatus incorporated in an electronic apparatus energized by a battery such as a PDA (personal digital/data assistant) and a mobile phone terminal, the LED driving apparatus 10 of the present invention not only helps extend the battery life of the electronic apparatus but also contributes to making the electronic apparatus light, thin and compact.

The switch SWc is kept on during a high-level period of the PWM signal. Thus, a high-level period of the PWM signal corresponds to a sampling period of the sample-hold circuit (formed of the switch SWc and the capacitor C1), and, in the monitor generating section 13, the opening/closing control of the transistor N1 (control of the current value of the current "im" that flows through the resistor R1) is performed according to an error voltage generated by the operational amplifier AMP2 such that the monitor voltage Vm is equal to the reference voltage Vref. As described above, however, since the switch SWb is kept off, the monitor voltage Vm is never fed back to the operational amplifier AMP1 constituting the regulator ha during a high-level period of the PWM signal.

On the other hand, when the PWM signal is shifted from high level to low level (OFF period of the driving currents iW1, iW2, and iW3), the switch SWc is turned off. Thus, a low-level period of the PWM signal corresponds to a hold period of the sample-hold circuit (formed of the switch SWc and the capacitor C1) constituting the monitor voltage generating section 13, and the gate-source voltage of the transistor N1 is maintained at a value thereof sampled immediately before the driving currents iW1, iW2, and iW3 are turned off.

As a result, the monitor voltage generating section 13 continues drawing, from the driving voltage Vout deriving terminal, the same current "im" as immediately before the driving currents iW1, iW2, and iW3 are turned off, and thus the amount of the voltage drop across the resistor R1 is held, and from the other end of the resistor R1 is derived the monitor voltage Vm generated by superposing on a reference voltage, which is used as a standard, a voltage corresponding to a difference occurring in the driving voltage Vout during the OFF period (in other words, a voltage signal for maintaining the driving voltage Vout at the value thereof immediately before the driving currents iW1, iW2, and iW3 are turned off).

During a low-level period of the PWM signal, the switches SWa are turned off, and the switch SWb is turned on. Thus, among the feedback paths of the operational amplifier AMP1 constituting the regulator 11a, the feedback path of the monitor voltage Vm is connected and the feedback paths of the feedback voltages VW1, VW2, and VW3 are disconnected, and thus, in the operational amplifier AMP1, the gate voltage of the output transistor P1 is generated such that the lowest one of the feedback voltages VR, VG, and VB and the monitor voltage Vm (here, the monitor voltage Vm) is equal to the reference voltage Vref.

As a result, in the driving voltage generating section 11, feedback control based on the monitor voltage Vm is performed so as to maintain the driving voltage Vout at a value thereof immediately before the driving currents iW1, iW2, and iW3 are turned off, and thus the driving voltage Vout does not greatly vary with the PWM control of the driving currents iW1, iW2, and iW3; this helps prevent sounding of the capacitor Cex that is externally connected to the LED driving apparatus 10.

With the LED driving apparatus 10 of this embodiment, since the driving voltage Vout does not decrease, the step-up ratio of the charge pump 11b can be maintained even during a low-level period of the PWM signal (an OFF period of the driving currents iW1, iW2, and iW3). Thus, even when the PWM signal shifts from low level to high level, no time is needed for recovery of the driving voltage Vout, and also, the driving currents iW1, iW2, and iW3 can be turned on without delay.

As described above, in the LED driving apparatus 10 of this embodiment, the driving voltage generating section 11 performs feedback control of the driving voltage Vout such that whichever of the feedback voltages VW1, VW2, and VW3 has the lowest value is equal to the reference voltage Vref during a high-level period of the PWM signal (an ON period of the driving currents iW1, iW2, and iW3) and such that the monitor voltage Vm is equal to the reference voltage Vref during a low-level period of the PWM signal (an OFF period of the driving currents iW1, iW2, and iW3).

This allows both feedback control of the driving voltage fed to the light emitting diodes and PWM control of the driving currents to be performed, and thus power consumption of the light emitting diodes can be reduced, and also light-emission brightness of the light emitting diodes can be controlled freely.

As described above, in the LED driving apparatus 10 of this embodiment, the PWM control by the driving current control section 12, the feedback-path switching control by the driving voltage generating section 11 (on/off control of the switches SWa and SWb), and the sample-hold control by the monitor voltage generating section 13 (on/off control of the switch SWc) are all performed according to the common PWM signal. This allows the timings of all the control described above to be closely connected with one another, without unnecessarily increasing the number of control signals.

In FIG. 1, for easier understanding of this invention, the first switch section 14 (the switches SWa) functioning as means for connecting/disconnecting the feedback path of the feedback voltages VW1, VW2, and VW3 is illustrated as one independent block, but this is not meant to limit the structure of the present invention in any manner; instead of the first switch section 14, there may be adopted a structure in which the fourth, fifth and sixth non-inverting input terminals (the reference voltages VW1, VW2, and VW3 application terminals) of the plurality of the non-inverting input terminals (+) of the operational amplifier AMP1 are each provided with a pull-up circuit such that the feedback voltages VW1, VW2, and VW3 are pulled up higher than the monitor voltage Vm during an OFF period of the driving currents iW1, iW2, and iW3. With this structure, since no resistance component exists in the feedback paths of the feedback voltages VW1, VW2, and VW3, more accurate feedback control of the driving voltage Vout can be achieved.

In FIG. 2, for easier understanding of this invention, the logic shifting timing of the PWM signal and the on/off shifting timings of the switches SWa, SWb, and SWc are illustrated as completely synchronous, but this is not meant to limit the present invention in any manner; for example, a period when the switches SWa and SWb are both on may be set such that when the PWM signal is shifted to high level, the feedback path of the monitor voltage Vm is disconnected after the feedback paths of the feedback voltages VW1, VW2, and VW3 are completely connected, and on the other hand, when the PWM signal is shifted to low level, the feedback paths of the feedback voltages VW1, VW2, and VW3 are disconnected after the feedback path of the monitor voltage Vm is completely connected. With this structure, a state where all the above-described feedback paths are disconnected never occurs, and this helps achieve stable feedback control of the driving voltage Vout.

Figure 3:
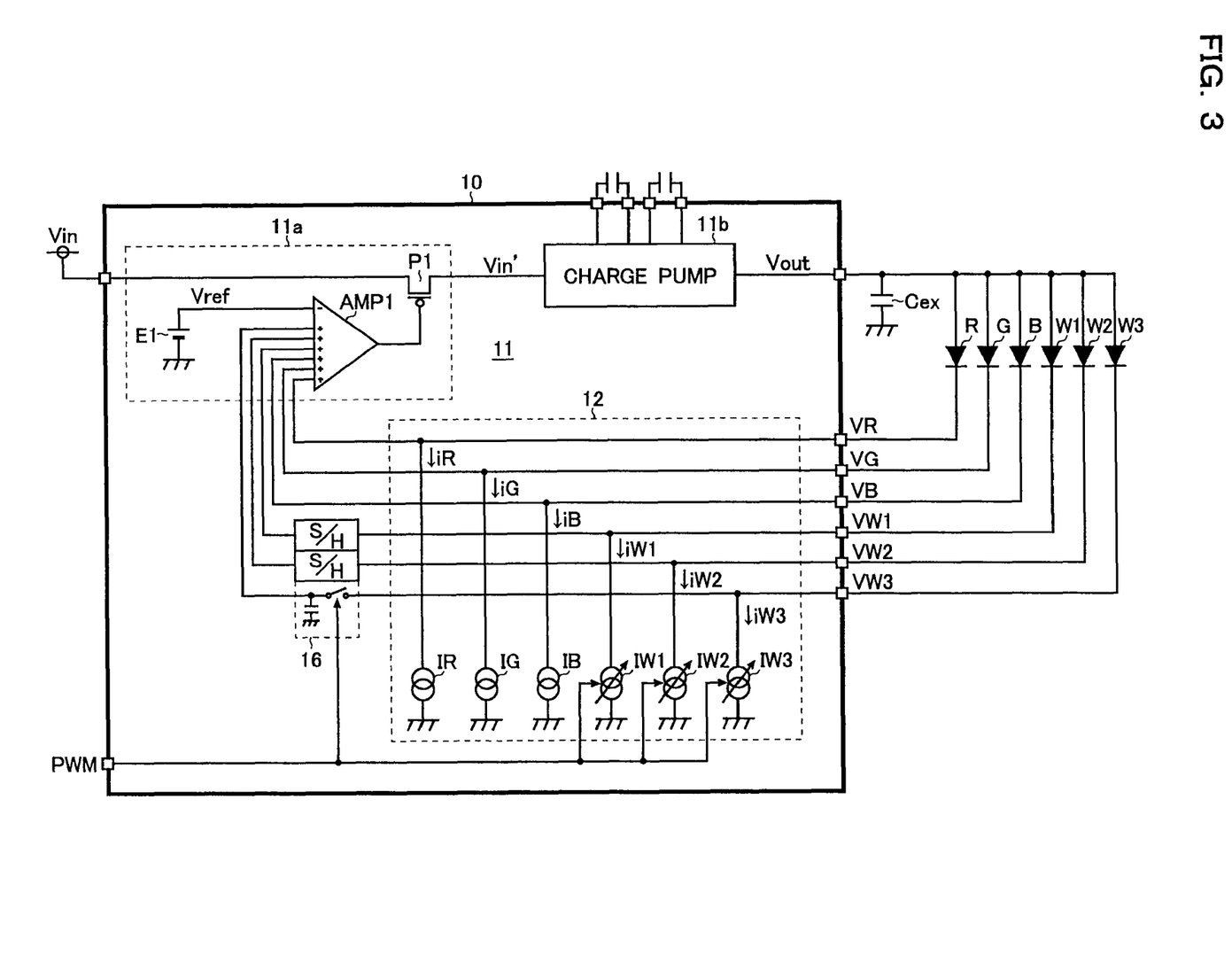
FIG. 3 is a block diagram showing another example of the structure of the LED driving apparatus of the present invention.

Another possible structure for performing both the feedback control of the driving voltage Vout fed to the light emitting diodes and the PWM control of the driving currents is a structure provided with, as shown in FIG. 3, a sample-hold circuit 16 that samples each of the feedback voltages VW1, VW2, and VW3 during a high-level period of the PWM signal (an ON period of the driving currents iW1 to iW3), and that holds the value of each of the feedback voltages VW1, VW2, and VW3 sampled immediately before the driving current is turned off during a low-level period of the PWM signal.

However, in contrast to the structure shown in FIG. 3, in which the same number of sample-hold circuits 16 as the number of the feedback paths need to be provided, the structure shown in FIG. 1 requires only one sample-hold circuit (i.e., the monitor voltage generating section 13) for any number of feedback paths, and thus the structure shown in FIG. 1 is preferable in view of achieving a small circuit scale.

Figure 4:
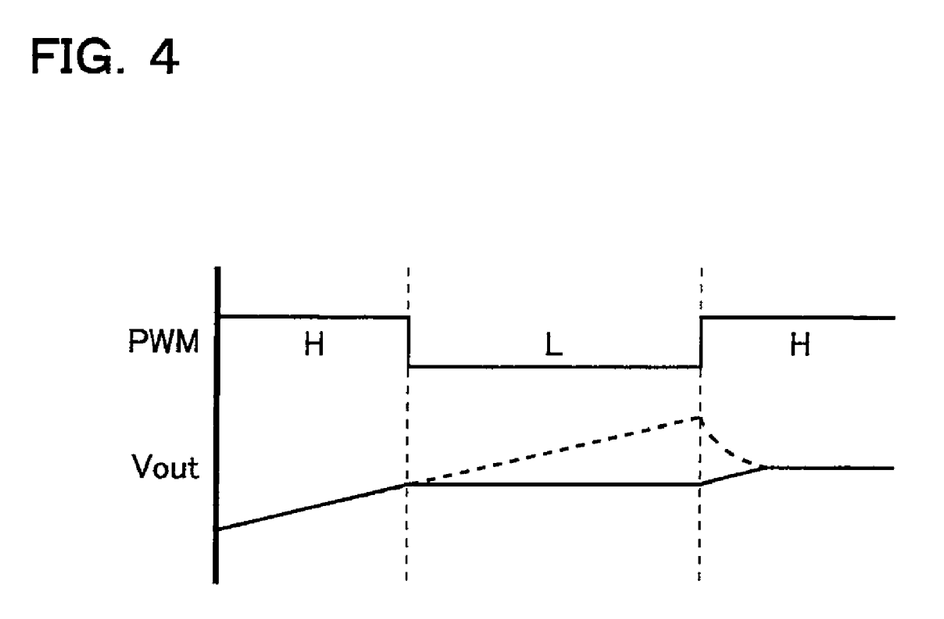
FIG. 4 is a diagram illustrating an excess step-up preventing effect achieved by the present invention.

In the case where the structure shown in FIG. 3 is adopted, if holding operation is performed while the driving voltage Vout is on the rise as indicated by a broken line in FIG. 4, the feedback voltages VW1, VW2, and VW3 are each held at a value lower than the reference voltage Vref, and thus the driving voltage Vout keeps on rising even in a low-level period of the PWM signal; in contrast, with the structure shown in FIG. 1, the driving voltage Vout is monitored and the driving currents iW1, iW2, and iW3 are feedback controlled so as to maintain the driving voltage Vout at a value thereof immediately before the driving currents iW1, iW2, and iW3 are turned off, and thus, as indicated by a solid line in FIG. 4, the driving voltage Vout does not rise to excess. Thus, in view of achieving safety of the apparatus, it is preferable to adopt the structure shown in FIG. 1.

Also, in the case where the structure shown in FIG. 3 is adopted, a resistance component and a capacitance component exist in the feedback paths of the feedback voltages VW1, VW2, and VW3. Thus, in view of achieving feedback control of higher accuracy, it is preferable to adopt the structure shown in FIG. 1.

The present invention may be carried out in any manner other than specifically described above as an embodiment, and many modifications and variations are possible within the scope and spirit of the present invention.

For example, the embodiment described above deals with a structure in which the series regulator 11a and the charge pump 11b are used as the driving voltage generating section 11, but this is not meant to limit the structure of the present invention, and a step-up type switching regulator may be used. Also, the charge pump 11b, which functions as step-up means, may be omitted depending on factors such as the voltage level of the input voltage and the kind of the light emitting diodes.

Also, the embodiment described above deals with a structure for driving six parallelly-connected light emitting diodes, but this is not meant to limit the structure of the present invention, and the number of light emitting diodes connected in parallel or in series to one another can be changed as necessary.

INDUSTRIAL APPLICABILITY

The LED driving apparatus of the present invention can be used, for example, as means for driving a backlight of a liquid crystal display.

The invention claimed is:

1. A light emitting diode driving apparatus, comprising:
a driving voltage generating section for generating a driving voltage fed to an anode of a light emitting diode;
a driving current control section for performing pulse width modulation control of a driving current that flows through the light emitting diode; and
a monitor voltage generating section that generates a monitor voltage corresponding to the driving voltage,
wherein,
the monitor voltage generating section, during an ON period of the driving current, generates an error voltage between a predetermined reference voltage and the monitor voltage and performs feedback control of the monitor voltage based on the error voltage such that the monitor voltage is equal to the reference voltage, and the monitor voltage generating section, during an OFF period of the driving current, holds and outputs, as the monitor voltage, the error voltage immediately before the driving current is turned off; and
the driving voltage generating section performs feedback control of the driving voltage during an ON period of the driving current such that a feedback voltage derived from a cathode of the light emitting diode is equal to the reference voltage, and performs feedback control of the driving voltage during an OFF period of the driving current such that the monitor voltage is equal to the reference voltage.

2. The light emitting diode driving apparatus of claim 1, wherein the feedback voltage is pulled up to a level higher than the monitor voltage during an OFF period of the driving current.

3. The light emitting diode driving apparatus of claim 1, wherein the driving voltage generating section includes:
a regulator for generating an intermediate voltage from an input voltage such that either the feedback voltage or the monitor voltage is equal to the reference voltage; and
a charge pump for generating the driving voltage by stepping up the intermediate voltage.

4. The light emitting diode driving apparatus of claim 1, wherein the monitor voltage generating section includes:
an operational amplifier that generates an error voltage between the monitor voltage and the reference voltage; and
a sample-hold circuit that samples the error voltage during an ON period of the driving current, and that, during an OFF period of the driving current, holds a value of the error voltage sampled immediately before the driving current is turned off; and
wherein the monitor voltage generating section generates the monitor voltage according to an output from the sample-hold circuit.

5. The light emitting diode driving apparatus of claim 4, wherein the monitor voltage generating section further includes:
a resistor to a first end of which the driving voltage is applied and from a second end of which the monitor voltage is derived; and
a current supply that generates, according to an output from the sample-hold circuit, a current that flows through the resistor.

6. The light emitting diode driving apparatus of claim 5, wherein the pulse width modulation control, feedback path switching control performed by the driving voltage generating section, and sample-hold control performed by the monitor voltage generating section are all based on a common control signal.

7. A light emitting diode driving apparatus, comprising:
a driving voltage generating section for generating a driving voltage fed to anodes of a plurality of light emitting diodes;
a driving current control section for performing, based on a common control signal, pulse width modulation control of driving currents that flow through the plurality of light emitting diodes; and
a monitor voltage generating section for generating a monitor voltage corresponding to the driving voltage;
wherein:
the monitor voltage generating section, during an ON period of the driving currents, generates an error voltage between a predetermined reference voltage and the monitor voltage and performs feedback control of the monitor voltage based on the error voltage such that the monitor voltage is equal to the reference voltage, and the monitor voltage generating section, during an OFF period of the driving currents, holds and outputs, as the monitor voltage, the error voltage immediately before the driving currents are turned off; and
the driving voltage generating section performs feedback control of the driving voltage during an ON period of the driving currents such that a lowest one of feedback voltages derived from cathodes of the plurality of light emitting diodes is equal to the reference voltage, and the driving voltage generating section performs feedback control of the driving voltage during an OFF period of the driving currents such that the monitor voltage is equal to the reference voltage.

8. The light emitting diode driving apparatus of claim 7, wherein the feedback voltages are pulled up to a level higher than the monitor voltage during an OFF period of the driving currents.

9. The light emitting diode driving apparatus of claim 7, wherein the driving voltage generating section includes:
   a regulator for generating an intermediate voltage from an input voltage such that any one of the feedback voltages and the monitor voltage is equal to the reference voltage; and
   a charge pump for generating the driving voltage by stepping up the intermediate voltage.

10. The light emitting diode driving apparatus of claim 7, wherein the monitor voltage generating section includes:
   an operational amplifier that generates an error voltage between the monitor voltage and the reference voltage; and
   a sample-hold circuit that samples the error voltage during an ON period of the driving currents, and that, during an OFF period of the driving currents, holds a value of the error voltage sampled immediately before the driving currents are turned off; and
   wherein the monitor voltage generating section generates the monitor voltage according to an output from the sample-hold circuit.

11. The light emitting diode driving apparatus of claim 10, wherein the monitor voltage generating section further includes:
   a resistor to a first end of which the driving voltage is applied and from a second end of which the monitor voltage is derived; and
   a current supply that generates, according to an output from the sample-hold circuit, a current that flows through the resistor.

12. The light emitting diode driving apparatus of claim 11, wherein the pulse width modulation control, feedback path switching control performed by the driving voltage generating section, and sample-hold control performed by the monitor voltage generating section are all based on a common control signal.

13. A light emitting diode driving apparatus, comprising:
   a driving voltage generating section for generating a driving voltage fed to anodes of a plurality of light emitting diodes;
   a first driving current control section for performing pulse width modulation control of a driving current that flows through at least one of the plurality of light emitting diodes;
   a second driving current control section for supplying a constant current at all times to at least another of the plurality of light emitting diodes; and
   a monitor voltage generating section for generating a monitor voltage corresponding to the driving voltage;
   wherein:
      the monitor voltage generating section, during an ON period of the driving currents, generates an error voltage between a predetermined reference voltage and the monitor voltage and performs feedback control of the monitor voltage based on the error voltage such that the monitor voltage is equal to the reference voltage, and the monitor voltage generating section, during an OFF period of the driving currents, holds and outputs, as the monitor voltage, the error voltage immediately before the driving currents are turned off; and
      the driving voltage generating section performs feedback control of the driving voltage during an ON period of the driving currents such that a lowest one of feedback voltages derived from cathodes of the plurality of light emitting diodes is equal to the reference voltage, and the driving voltage generating section performs feedback control of the driving voltage during an OFF period of the driving currents such that a lowest one of the monitor voltage and feedback voltages derived from the cathodes of the plurality of light emitting diodes to which the constant currents are supplied by the second driving current control section is equal to the reference voltage.

14. The light emitting diode driving apparatus of claim 13, wherein, during an OFF period of the driving currents, a feedback voltage derived from a cathode of the at least one of the plurality of light emitting diodes to which a driving current is supplied by the first driving current control section is pulled up to a level higher than the monitor voltage.

15. The light emitting diode driving apparatus of claim 13, wherein the driving voltage generating section includes:
   a regulator for generating an intermediate voltage from an input voltage such that any one of the feedback voltages and the monitor voltage is equal to the reference voltage; and
   a charge pump for generating the driving voltage by stepping up the intermediate voltage.

16. The light emitting diode driving apparatus of claim 13, wherein the monitor voltage generating section includes:
   an operational amplifier that generates an error voltage between the monitor voltage and the reference voltage; and
   a sample-hold circuit that samples the error voltage during an ON period of the driving currents, and that, during an OFF period of the driving currents, holds a value of the error voltage sampled immediately before the driving currents are turned off; and
   wherein the monitor voltage generating section generates the monitor voltage according to an output from the sample-hold circuit.

17. The light emitting diode driving apparatus of claim 16, wherein the monitor voltage generating section further includes:
   a resistor to a first end of which the driving voltage is applied and from a second end of which the monitor voltage is derived; and
   a current supply that generates, according to an output from the sample-hold circuit, a current that flows through the resistor.

18. The light emitting diode driving apparatus of claim 17, wherein the pulse width modulation control, feedback path switching control performed by the driving voltage generating section, and sample-hold control performed by the monitor voltage generating section are all based on a common control signal.

19. A light emitting diode driving apparatus, comprising:
   a driving voltage generating section for generating a driving voltage fed to an anode of a light emitting diode;
   a driving current control section for performing pulse width modulation control of a driving current that flows through the light emitting diode; and
   a monitor voltage generating section that monitors the driving voltage, and that generates a monitor voltage during an OFF period of the driving current by superposing on a reference voltage, which is used as a standard, a voltage corresponding to a difference occurring in the driving voltage during the OFF period, wherein the driving voltage generating section performs feedback control of the driving voltage during an ON period of the driving current such that a feedback voltage derived from a cathode of the light emitting diode is equal to the reference voltage, and the driving voltage generating section performs feedback control of the driving voltage during an OFF period of the driving current such that the monitor voltage is equal to the reference voltage; and the monitor voltage generating section includes:

a resistor to a first end of which the driving voltage is applied and from a second end of which the monitor voltage is derived;

an operational amplifier that generates an error voltage between the monitor voltage and the reference voltage;

a sample-hold circuit that samples the error voltage during an ON period of the driving current, and that, during an OFF period of the driving current, holds a value of the error voltage sampled immediately before the driving current is turned off; and a current supply that generates, according to an output from the sample-hold circuit, a current that flows through the resistor.

20. The light emitting diode driving apparatus of claim 19, wherein pulse width modulation control performed by the driving current control section, feedback path switching control performed by the driving voltage generating section, and sample-hold control performed by the monitor voltage generating section are all based on a common control signal.

\* \* \* \* \*